(12) United States Patent
Yamaguchi

(10) Patent No.: US 7,126,101 B2
(45) Date of Patent: Oct. 24, 2006

(54) IMAGE PICKUP DEVICE

(75) Inventor: Takao Yamaguchi, Hachioji (JP)

(73) Assignee: Olympus Corporation, Tokyo (JP)

( * ) Notice: Subject to any disclaimer, the term of this patent is extended or adjusted under 35 U.S.C. 154(b) by 150 days.

(21) Appl. No.: 10/872,985

(22) Filed: Jun. 21, 2004

(65) Prior Publication Data

US 2004/0263616 A1    Dec. 30, 2004

(30) Foreign Application Priority Data

Jun. 25, 2003    (JP)    ............................ 2003-181792

(51) Int. Cl.
*H01L 27/00* (2006.01)
*H01L 31/0203* (2006.01)

(52) U.S. Cl. .................... 250/208.1; 257/434

(58) Field of Classification Search ............ 250/208.1, 250/239; 257/433, 444, 431, 432, 434, 680, 257/704; 385/94

See application file for complete search history.

(56) References Cited

U.S. PATENT DOCUMENTS 6,611,001 B1 *   8/2003   Cappuzzo et al. ............ 257/81
6,945,708 B1 *   9/2005   Crafts et al. ................. 385/89

FOREIGN PATENT DOCUMENTS

JP    2000-333903    12/2000
JP    2001-053989    2/2001

OTHER PUBLICATIONS

"Comparison Between Median Filtering and Vertical Edge Controlled Interpolation for Flicker Reduction", Dipl.-Ing. Christian Hentschel, IEEE Transaction on Consumer Electronics, vol. 35, No. 3 (1989), New York, USA.

* cited by examiner

*Primary Examiner*—Georgia Epps
*Assistant Examiner*—Don Williams
(74) *Attorney, Agent, or Firm*—Scully, Scott, Murphy & Presser, P.C.

(57)    ABSTRACT

An image pickup device has a hermetic packaging portion for hermetically enclosing an image pickup unit having one solid-state image pickup element. The hermetic packaging portion includes a non-cylindrical portion having a cross section substantially similar to that of the image pickup unit and hermetic joint portions at both the ends of the non-cylindrical portion. Each hermetic joint portion has a nearly R-shaped section.

24 Claims, 12 Drawing Sheets

A-A

B-B

IMAGE PICKUP DEVICE

This application claims benefit of Japanese Application No. 2003-181792 filed in Japan on Jun. 25, 2003, the contents of which are incorporated by this reference.

BACKGROUND OF THE INVENTION

1. Field of the Invention

The present invention relates to image pickup devices and, more particularly, to an image pickup device having a hermetic packaging for hermetically enclosing an image pickup unit.

2. Description of the Related Art

Most conventional image pickup devices each have an image pickup unit with one solid-state image pickup element such as a CCD (charge-coupled device), namely, a single-CCD image pickup unit. This type of image pickup device has a simple structure and is inexpensive.

Japanese Unexamined Patent Application Publication Nos. 2000-333903 and 2001-53989 disclose image pickup devices of the above-mentioned conventional type. Each image pickup device, that is detachable, is connected to an eyepiece of an endoscope. The image pickup device captures a subject image supplied from the endoscope.

As disclosed in the above patent documents, the image pickup device is designed such that the single-CCD image pickup unit is enclosed in a hermetic packaging, which is hermetically sealed in order to protect components of the optical system and the like from exposure to vapor.

The single-CCD image pickup unit can longitudinally receive an optical image of a subject directly from the optical system. The single-CCD image pickup unit has a nearly cylindrical shape. Accordingly, in the conventional image pickup device, the hermetic packaging can be shaped into a substantially cylinder. Therefore, the above-mentioned conventional image pickup device can be reduced in size such that a wasted space is not created between the image pickup device and the image pickup unit.

SUMMARY OF THE INVENTION

The present invention provides an image pickup device including: a hermetic packaging portion for hermetically enclosing an image pickup unit having one solid-state image pickup element, the hermetic packaging portion including a non-cylindrical portion having a cross section substantially similar to that of the image pickup unit and two hermetic joint portions at both the ends of the non-cylindrical portion, each hermetic joint portion having a nearly R-shaped section.

Further, the present invention provides an image pickup device including: a hermetic packaging portion for hermetically enclosing an image pickup unit having one solid-state image pickup element, the hermetic packaging portion constituting a non-cylindrical packaging main body which encloses the image pickup unit and has a cross section substantially similar to that of the image pickup unit, and hermetic joint portions at both the ends of the packaging main body, each hermetic joint portion having a nearly R-shaped section.

Further, the present invention provides an image pickup device including: a hermetic packaging portion for hermetically enclosing an image pickup unit having one solid-state image pickup element, the hermetic packaging portion constituting a non-cylindrical packaging main body which encloses the image pickup unit and has a cross section substantially similar to that of the image pickup unit, a front hermetic joint portion for hermetically joining a lens frame to the front end of the packaging main body, and a back-end hermetic joint portion for hermetically joining an electrode frame to the back end of the packaging main body.

DESCRIPTION OF THE PREFERRED EMBODIMENTS

Embodiments of the present invention will now be described hereinbelow with reference to the drawings.

First Embodiment

According to a first embodiment, the present invention is applied to an image pickup device for an endoscope used in an endoscope system.

Figure 1:
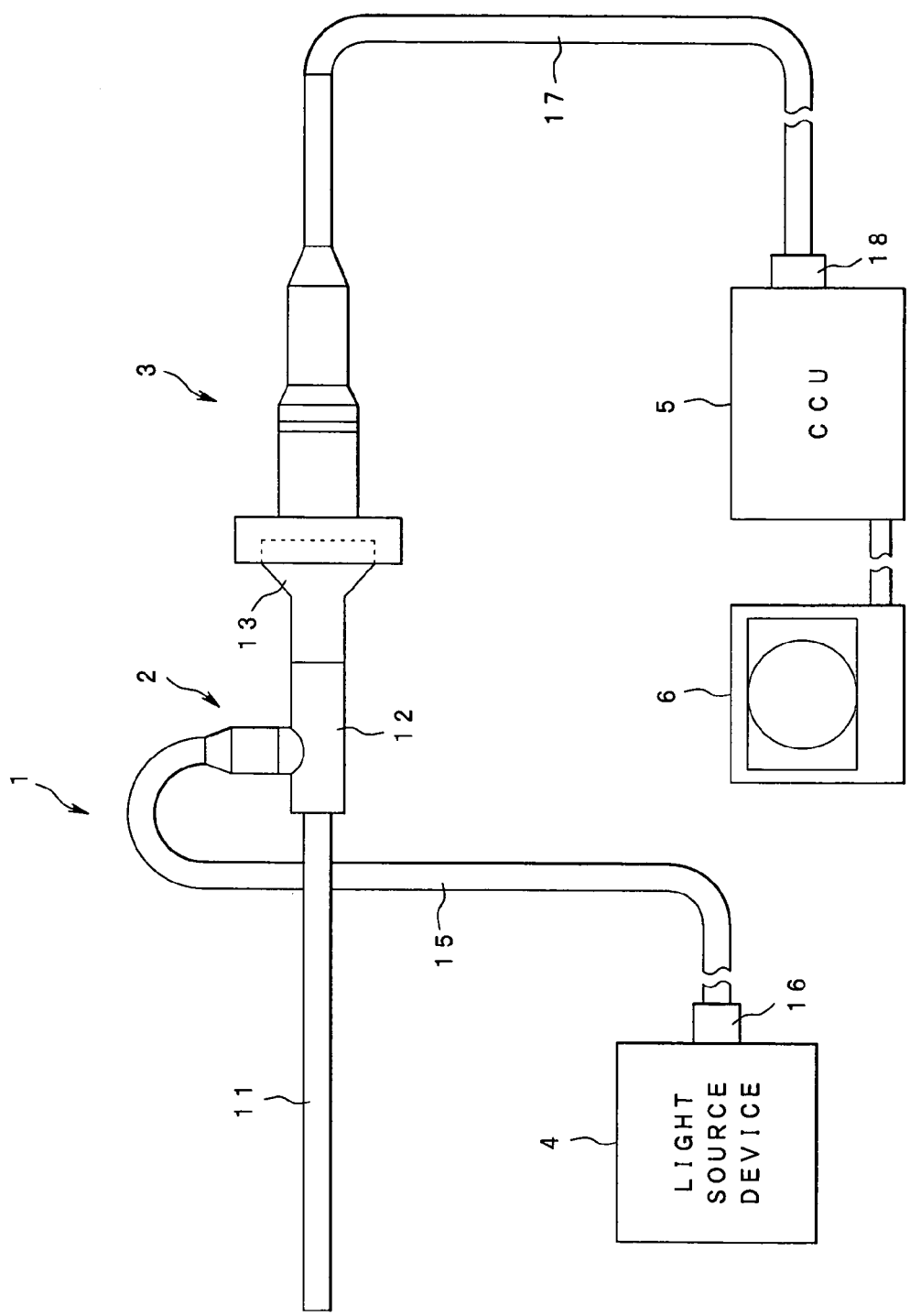
FIG. 1 is a diagram of the entire structure of an endoscope system according to a first embodiment of the present invention.

Referring to FIG. 1, an endoscope system 1 includes: an endoscope 2; an endoscopic image pickup device (hereinbelow, simply referred to as an image pickup device) 3 detachably connected to the endoscope 2; a light source device 4 for supplying light to the endoscope 2; a camera control unit (hereinbelow, abbreviated to a CCU) 5 for processing signals generated from the image pickup device 3; and a monitor 6 for displaying an image based on video signals generated from the CCU 5.

The endoscope 2 includes a long insertion portion 11, a large-diameter grip 12 connected to the proximal end of the insertion portion 11; and an eyepiece 13 arranged at the back end of the grip 12.

A light guide cable 15 is connected to a cap on the side of the grip 12 of the endoscope 2. A connector 16 provided at the other end of the light guide cable 15 is detachably connected to the light source device 4.

White light generated by a lamp (not shown) in the light source device 4 is supplied to an entrance plane of the light guide cable 15. The white light transmits from the light source device 4 through the light guide cable 15 and then illuminates a subject through an illumination window (not shown) at the distal end of the insertion portion 11.

Reflected light from the illuminated subject is incident on an observation window (not shown) at the distal end of the insertion portion 11. The incident light, reflected by the subject, passes through objective optical system (not shown) arranged behind the observation window, so that an optical image is formed by the objective optical system. The optical image of the subject is incident on image transmitting means (not shown) such as relay optical system, of which an entrance plane is arranged at a position where an image is formed by the objective optical system. The incident optical image is transmitted to the eyepiece 13 through the image transmitting means.

The transmitted optical image of the subject is incident on eyepiece optical system (not shown) arranged in the eyepiece 13 through an exit plane of the image transmitting means. The incident optical image is enlarged and is observed as an endoscopic image through an eyepiece window 13a (refer to FIG. 2).

The image pickup device 3, which is detachable, is attached to the eyepiece 13 of the endoscope 2.

A camera cable 17 extends from the back end of the image pickup device 3. The camera cable 17 has a connector 18 at the other end. The connector 18 is detachably connected to the CCU 5.

The image pickup device 3 has an observation window facing the eyepiece window 13a of the eyepiece 13. The observation window will be described later. Image-forming optical system is arranged behind the observation window. Solid-state image pickup elements such as CCDs are disposed in a position where an image is formed by the image-forming optical system (refer to FIG. 2).

Drive signals are supplied via a plurality of signal lines in the camera cable 17 to the solid-state image pickup elements. Each solid-state image pickup element captures a formed endoscopic image, namely, converts (photoelectric conversion) the optical image into electric signals (image signals).

The electric signals (image signals), produced by the solid-state image pickup elements, are supplied to the CCU 5.

The CCU 5 converts the supplied image signals into standard video signals. The video signals generated by the CCU 5 are output to the monitor 6. The monitor 6 receives the video signals and then displays an endoscopic image based on the video signals on a display screen.

Figure 2:
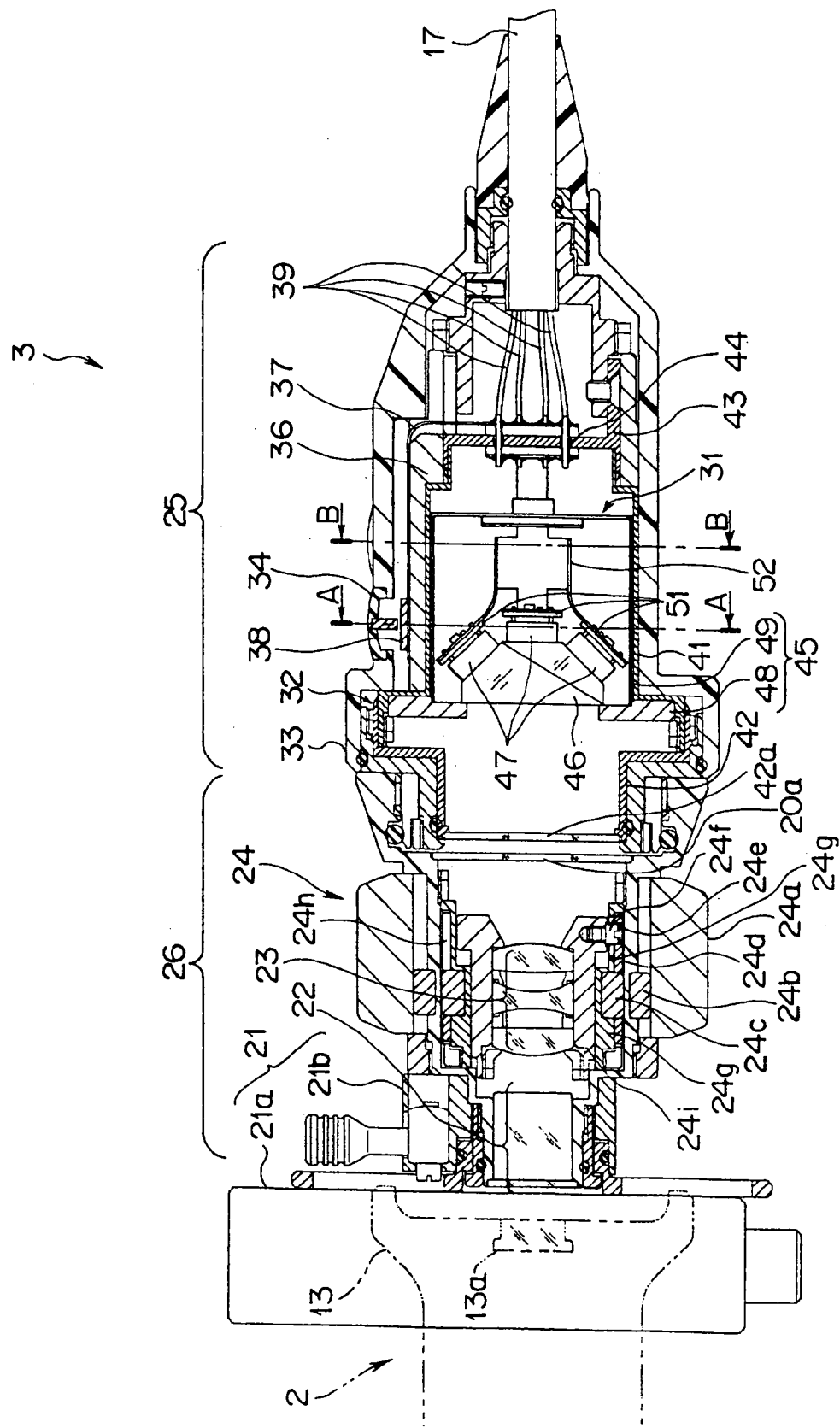
FIG. 2 is a sectional view of the detailed structure of an image pickup device in FIG. 1.

The structure of the image pickup device 3 according to the present invention will be concretely described hereinbelow with reference to FIG. 2.

The image pickup device 3 includes a scope mount unit 21, a cover glass unit 22, an image-forming optical unit 23, a focusing unit 24, and an image pickup optical unit 25.

The scope mount unit 21 is detachably connected to the eyepiece 13 of the endoscope 2. A subject image supplied from the eyepiece 13 of the endoscope 2 first passes through the cover glass unit 22. The image-forming optical unit 23 includes a plurality of image-forming lenses for forming a subject image. The focusing unit 24 moves the image-forming optical unit 23 along an optical axis to adjust a focus. The image pickup optical unit 25 captures the subject image formed by the image-forming optical unit 23 and converts the image into electric signals. An iris composed of aperture blades for controlling the amount of light of a subject image can be arranged between the cover glass unit 22 and the image-forming optical unit 23.

The scope mount unit 21 includes a coupler portion 21a and a rotation mechanical portion 21b.

The coupler portion 21a, that is detachable, is attached to the endoscope 2. The rotation mechanical portion 21b connects the coupler portion 21a with the main body of the image pickup device 3 such that the coupler portion 21a is rotatable (in the forward and reverse directions) about the optical axis. The rotation mechanical portion 21b also controls (locks) the rotation.

The focusing unit 24 includes a focus ring 24a, an outer magnet 24b, an inner magnet 24c, and an inner ring 24d. When the focus ring 24a is rotated, the inner magnet 24c magnetically coupled with the outer magnet 24b is rotated. When the inner magnet 24c is rotated, the inner ring 24d is rotated.

When the inner ring 24d is rotated, a helical cam groove 24e on the inner ring 24d affects the movement of a cam pin 24f in the rotating direction along the optical axis.

The cam pin 24f is screwed and fitted to an image-forming frame 24i. A straight groove 24h on a holding frame 24g prevents the cam pin 24f from moving in the rotating direction, so that the cam pin 24f moves forward or backward only along the optical axis. Consequently, the image-forming frame 24i moves forward or backward only along the optical axis, thus adjusting a focus of the image pickup device 3.

According to the present embodiment, the scope mount unit 21, the cover glass unit 22, the image-forming optical unit 23, and the focusing unit 24 constitute an optical adapter unit 26, which is separated from the image pickup optical unit 25. The image pickup optical unit 25 is detachable from the optical adapter unit 26.

The image pickup optical unit 25 includes a 3CCD image pickup unit (hereinbelow, simply referred to as an image pickup unit) 31, a hermetic packaging 32, and a resin exterior portion 33. The resin exterior portion 33 contains the hermetic packaging 32 for hermetically enclosing the image pickup unit 31.

Figure 3:
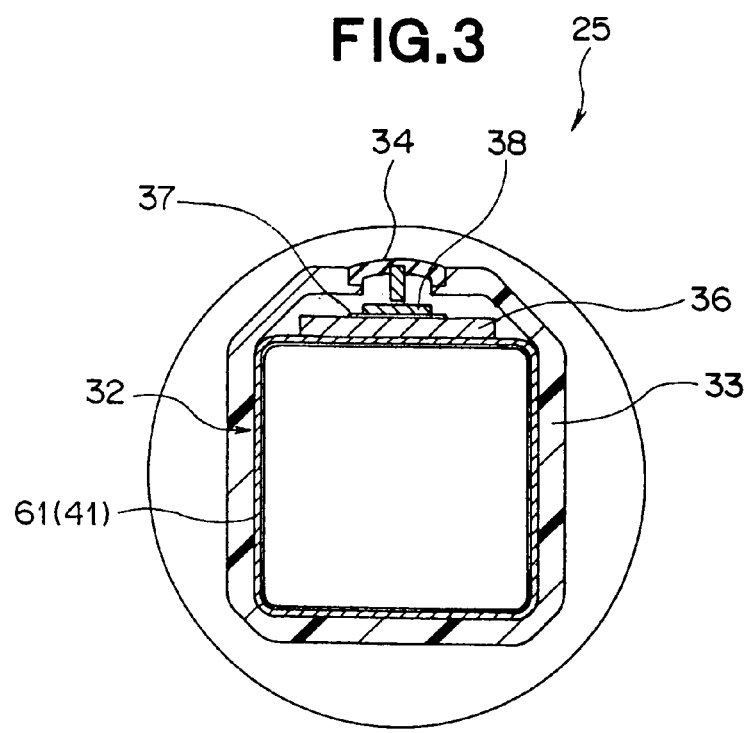
FIG. 3 is a cross sectional view of the image pickup device at the line A—A of FIG. 2.
Figure 4:
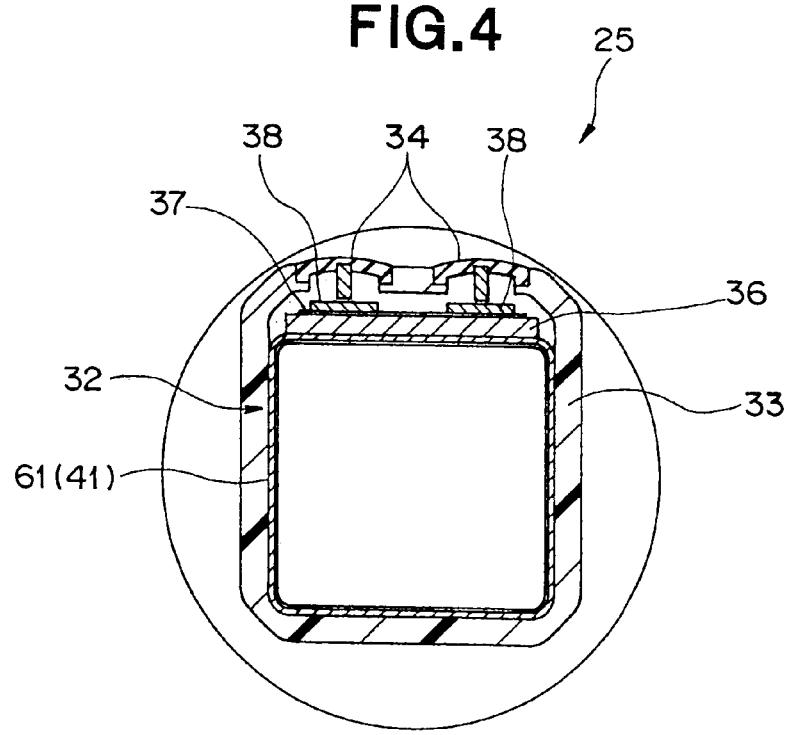
FIG. 4 is a cross sectional view of the image pickup device at the line B—B of FIG. 2.

Three remote switch units 34 for freezing or releasing the CCU 5 are arranged on the exterior portion 33 (refer to FIGS. 3 and 4). A flexible substrate 37 is supported by a base portion 36.

Tactile switches 38 are arranged on the flexible substrate 37 below the respective remote switch units 34. The flexible substrate 37 is connected to the back end of a hermetic connector unit, which will be described later. The flexible substrate 37 is electrically connected to the CCU 5 through the hermetic connector unit and signal lines 39 in the camera cable 17.

The hermetic packaging 32 includes a packaging main frame 41, a lens frame 42, and an electrode frame 43.

The packaging main frame 41 encloses the image pickup unit 31. The lens frame 42 is joined to the front end of the packaging main frame 41. The electrode frame 43 is joined to the back end of the packaging main frame 41.

In the lens frame 42, a cover glass 42a is hermetically fixed so as to face an eyepiece window 20a of the optical adapter unit 26. The electrode frame 43 has a hermetic connector unit 44. The hermetic connector unit 44 is joined to the electrode frame 43 such that a plurality of contact pins serving as conductors are hermetically sealed with sintered glass and the respective pins are insulated from each other.

The image pickup unit 31 is arranged in a main unit frame 45. The main unit frame 45 is composed of a unit base plate 48 and a protective frame 49 having a rectangular cross section.

The unit base plate 48 supports and fixes a dichroic prism 46 and three solid-state image pickup elements 47. The protective frame 49 protects the dichroic prism 46 and the three solid-state image pickup elements 47 supported and fixed by the unit base plate 48.

Each solid-state image pickup element 47 has a circuit board 51 on the rear surface thereof. The respective circuit boards 51 are connected to a flexible substrate 52. The flexible substrate 52 is connected to the contact pins of the hermetic connector unit 44.

The image pickup unit 31 with the above-mentioned structure captures an endoscopic image supplied from the eyepiece window 20a of the optical adapter unit 26 through the cover glass 42a. In the image pickup unit 31, the captured endoscopic image passes through an optical filter (not shown). Then, the dichroic prism 46 separates the endoscopic image into red (R), green (G), and blue (B) components corresponding to the three primary colors of light. The respective components are formed as endoscopic images on the corresponding image pickup planes of the three solid-state image pickup elements 47.

The solid-state image pickup elements 47 receive drive signals from the CCU 5 through the signal lines 39 in the camera cable 17 and the hermetic connector unit 44. Each solid-state image pickup element 47 converts the corresponding optical endoscopic image into electric image signals. The produced image signals are transmitted to the CCU 5 through the hermetic connector unit 44 and the signal lines 39.

Referring to FIGS. 3 and 4, the image pickup unit 31 is shaped into a nearly rectangular parallelepiped. The hermetic packaging 32 encloses the image pickup unit 31. The hermetic packaging 32 includes a non-cylindrical portion 61 in the packaging main frame 41. The cross section of the non-cylindrical portion 61 is substantially similar to that of the image pickup unit 31.

According to the present embodiment, to hermetically join the lens frame 42 and the electrode frame 43 to the packaging main frame 41, hermetic joint portions each having a nearly R-shaped section are provided at both the ends of the non-cylindrical portion 61. The hermetic joint portions will be described later.

Next, the structure of the hermetic packaging 32 will now be described in detail hereinbelow with reference to FIGS. 5 and 6. The hermetic packaging 32 includes the packaging main frame 41 having a nearly rectangular parallelepiped portion 61A. The nearly rectangular parallelepiped portion 61A serves as the non-cylindrical portion 61, of which the cross section is substantially similar to that of the image pickup unit 31.

In the packaging main frame 41, the nearly rectangular parallelepiped portion 61A has the hermetic joint portions at both the ends. Each hermetic joint portion is shaped into a cylinder. In other words, the packaging main frame 41 has a front hermetic joint portion 62 and a back-end hermetic joint portion 63, each joint portion having a circular section. The packaging main frame 41 is formed by cutting, MIM (metal injection molding), or drawing.

The lens frame 42 is a cylinder in which a portion to be fitted to the front hermetic joint portion 62 has a circular section.

Similarly, the electrode frame 43 is a cylinder in which a portion to be fitted to the back-end of the packaging main frame 41 has a circular section.

Accordingly, hermetically joining the packaging main frame 41, the lens frame 42, and the electrode frame 43 to form the hermetic packaging 32 can be easily achieved by laser welding or soldering. Thus, hermetic reliability of the hermetic packaging 32 can be increased.

Figure 5:
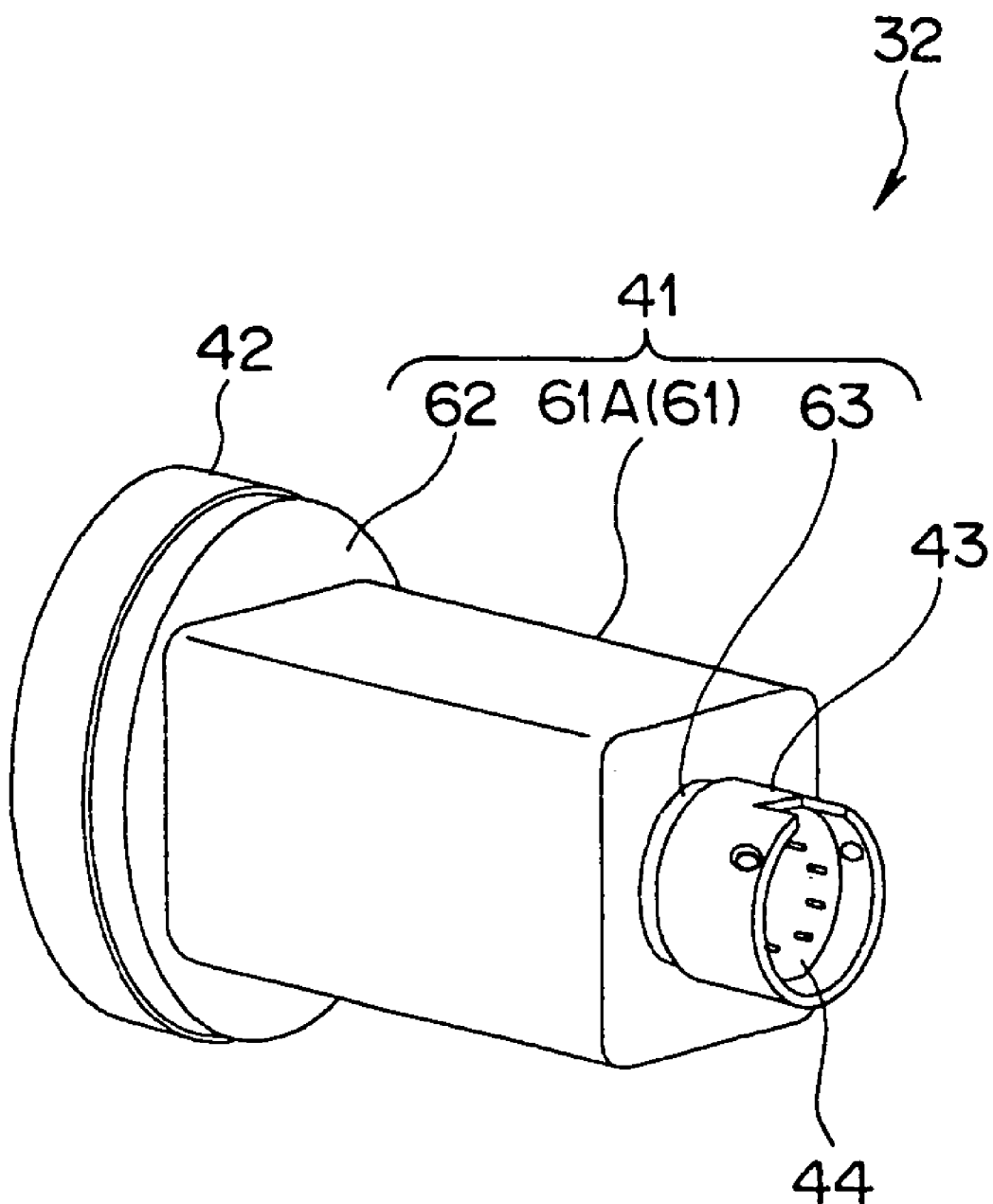
FIG. 5 is an assembly perspective view of a hermetic packaging in FIG. 2.
Figure 6:
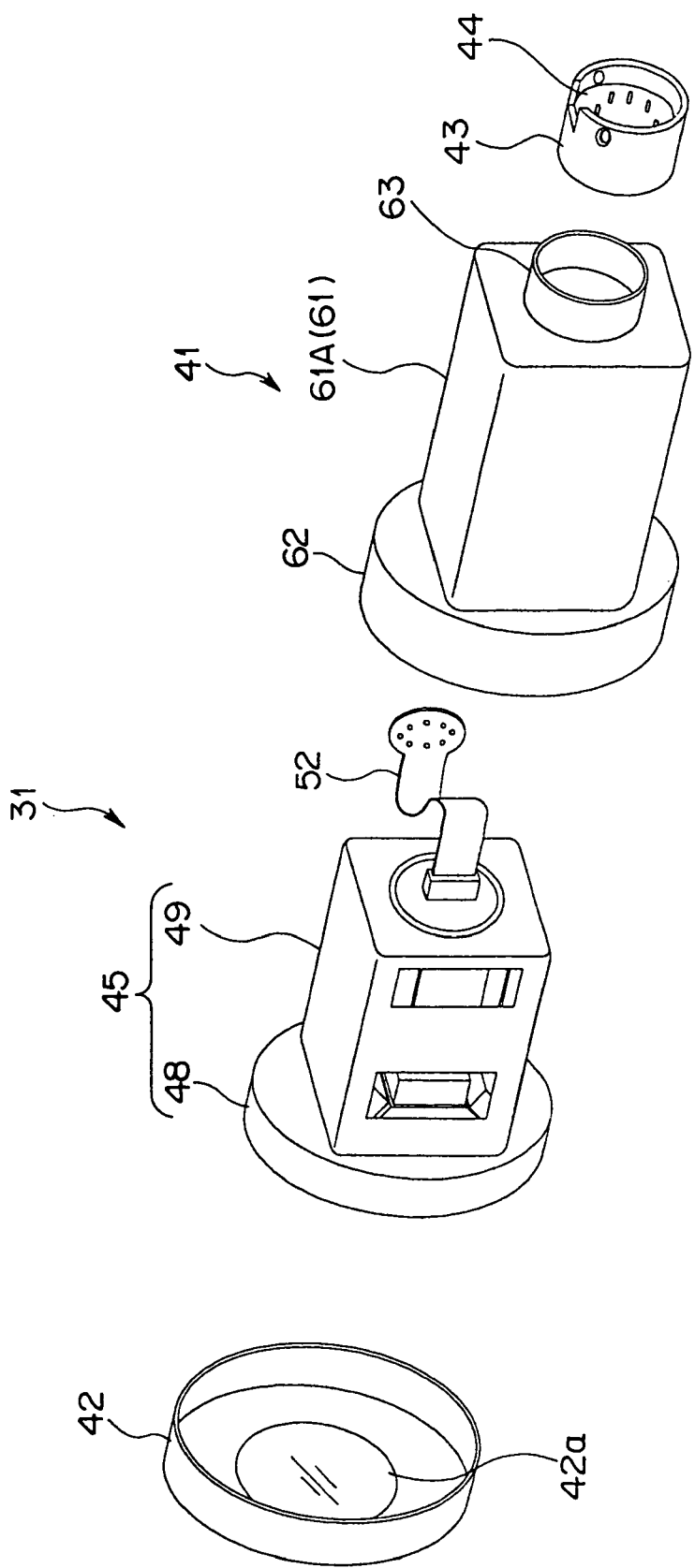
FIG. 6 is an exploded perspective view of the hermetic packaging of FIG. 5.

Referring to FIG. 5, the lens frame 42 and the electrode frame 43 are fitted to the packaging main frame 41 enclosing the image pickup unit 31, thus assembling the packaging 32.

In laser welding, the assembled packaging is rotated and each joined portion is irradiated with a laser beam. Since each joint portion of the packaging is a cylinder, a distance between a laser emission point and a target joined portion becomes constant in rotating.

Consequently, hermetically joining the packaging main frame 41, the lens frame 42, and the electrode frame 43 to form the hermetic packaging 32 can be easily accomplished by laser welding.

On the other hand, in soldering, solder is applied to the respective joint portions and the peripheral portions thereof in the assembled packaging and the solder is heated at high frequency. Thus, the solder enters fitted portions.

Therefore, hermetically joining the packaging main frame 41, the lens frame 42, and the electrode frame 43 to form the hermetic packaging 32 can be easily achieved by soldering.

Figure 7:
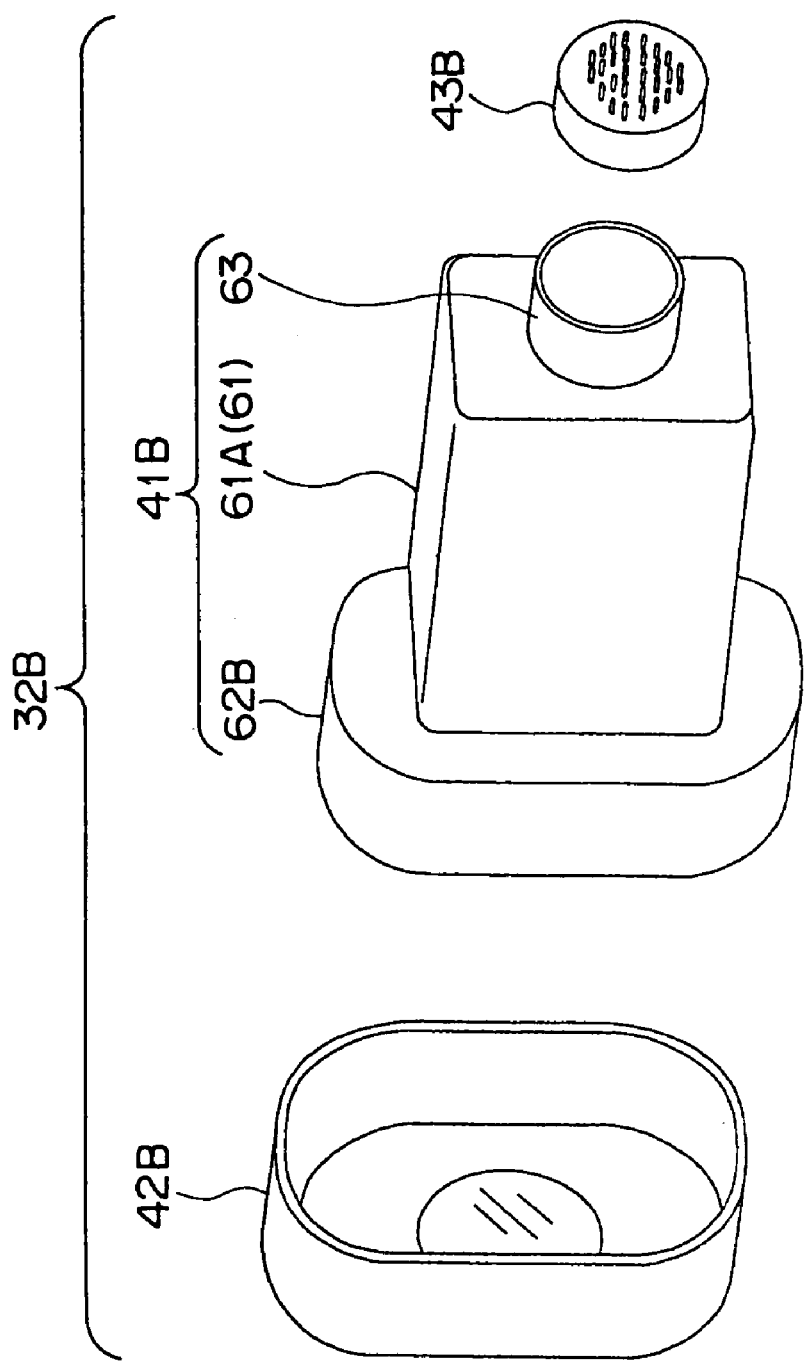
FIG. 7 is an exploded perspective view of a first modification of the hermetic packaging of FIG. 6.
Figure 8:
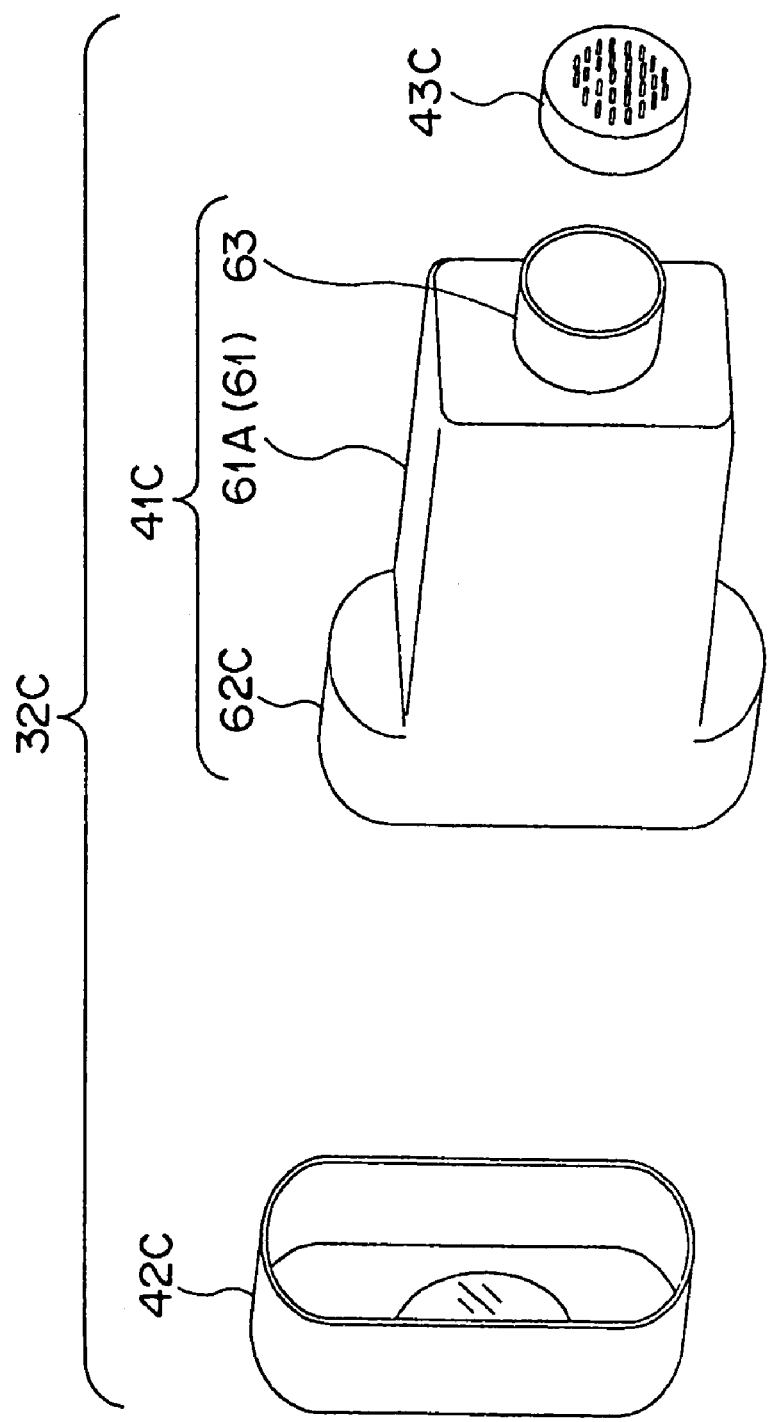
FIG. 8 is an exploded perspective view of a second modification of the hermetic packaging of FIG. 6.

The hermetic packaging 32 can also be formed as shown in FIGS. 7 and 8.

Referring to FIG. 7, a hermetic packaging 32B is designed such that a front hermetic joint portion 62B of a packaging main frame 41B is shaped into an oval and an electrode frame 43B is hermetically joined to the back-end hermetic joint portion 63. A portion of a lens frame 42B to be fitted to the front hermetic joint portion 62B is also shaped into an oval.

Referring to FIG. 8, a hermetic packaging 32C is designed such that a front hermetic joint portion 62C of a packaging main frame 41C is shaped into a long oval, a portion of a lens frame 42C to be fitted to the front hermetic joint portion 62C is also shaped into a long oval, and an electrode frame 43C is hermetically joined to the back-end hermetic joint portion 63.

Figure 9:
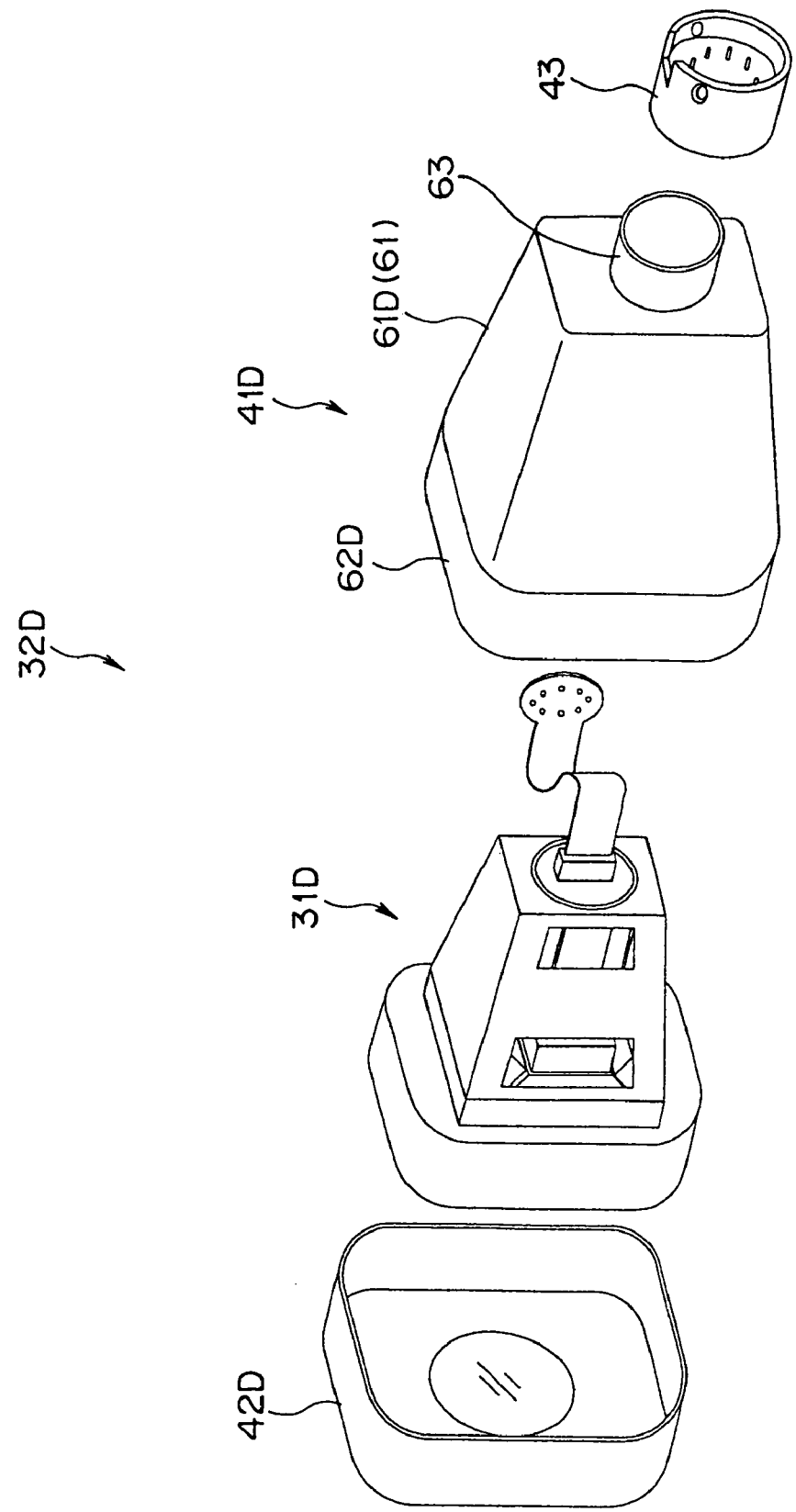
FIG. 9 is an exploded perspective view of a third modification of the hermetic packaging of FIG. 6.

The hermetic packaging can also be formed as shown in FIG. 9.

Referring to FIG. 9, a hermetic packaging 32D includes a packaging main frame 41D, of which a portion has a nearly square pyramidal section that is substantially similar to the image pickup unit 31D having a nearly pyramidal shape.

The packaging main frame 41D has a front hermetic joint portion 62D, which corresponds to the lower portion of the nearly square pyramidal section. The front hermetic joint portion 62D has a nearly rectangular section with rounded corners. A portion of a lens frame 42D to be fitted to the front hermetic joint portion 62D also has a nearly rectangular section with rounded corners.

For the above-mentioned hermetic packaging components 32B, 32C, and 32D in FIGS. 7 to 9, in laser welding, welding is performed in consideration of the shape of each joint portion so that a distance between a laser emission point and a target joined portion becomes constant.

According to the present embodiment, therefore, the image pickup device can be formed such that the hermetic packaging has a shape similar to that of the image pickup unit to reduce a wasted space as much as possible.

Second Embodiment

According to the foregoing first embodiment, the present invention is applied to the image pickup device in which the image pickup optical unit 25 is detachable from the optical adapter unit 26. According to a second embodiment, the present invention is applied to an image pickup device in which an optical adapter unit is integrated with an image pickup optical unit. The other components are similar to those of the first embodiment. Accordingly, the same components as those of the first embodiment are designated by the same reference numerals and a description of the previously described components is omitted in the description of the second embodiment.

Figure 10:
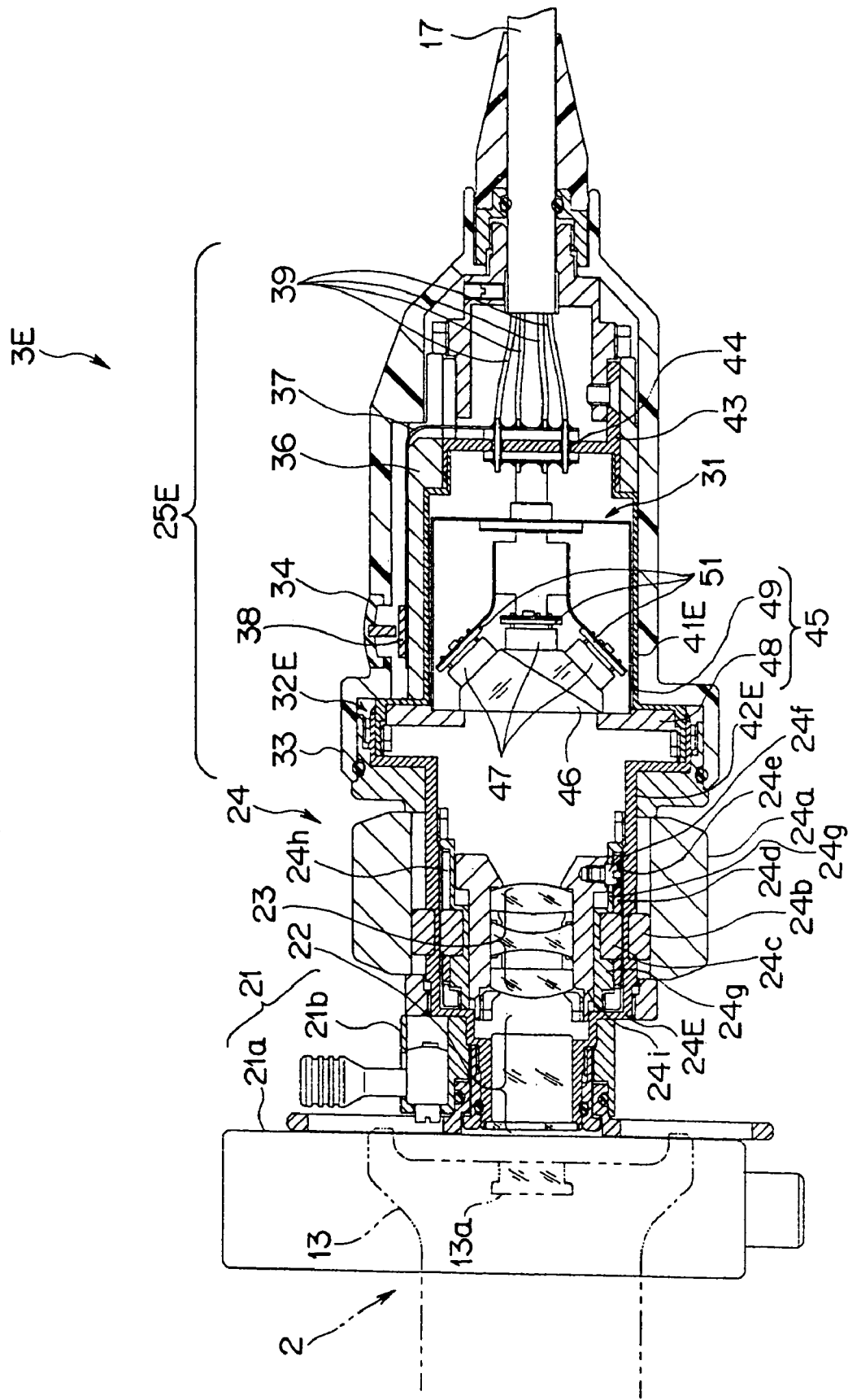
FIG. 10 is a sectional view of the detailed structure of an image pickup device according to a second embodiment of the present invention.

Referring to FIG. 10, an image pickup device 3E according to the second embodiment includes an optical adapter unit and an image pickup optical unit which are integrated with each other. Specifically speaking, the image pickup device 3E includes a scope mount unit 21, a cover glass unit 22, an image-forming optical unit 23; a focusing unit 24, and an image pickup optical unit 25E in a one-piece design.

A lens frame 42E is joined to the front end of a packaging main frame 41E of a hermetic packaging 32E. The lens frame 42E has therein the cover glass unit 22, the image-forming optical unit 23, and the focusing unit 24 (excluding a focus ring 24a and an outer magnet 24b).

Figure 11:
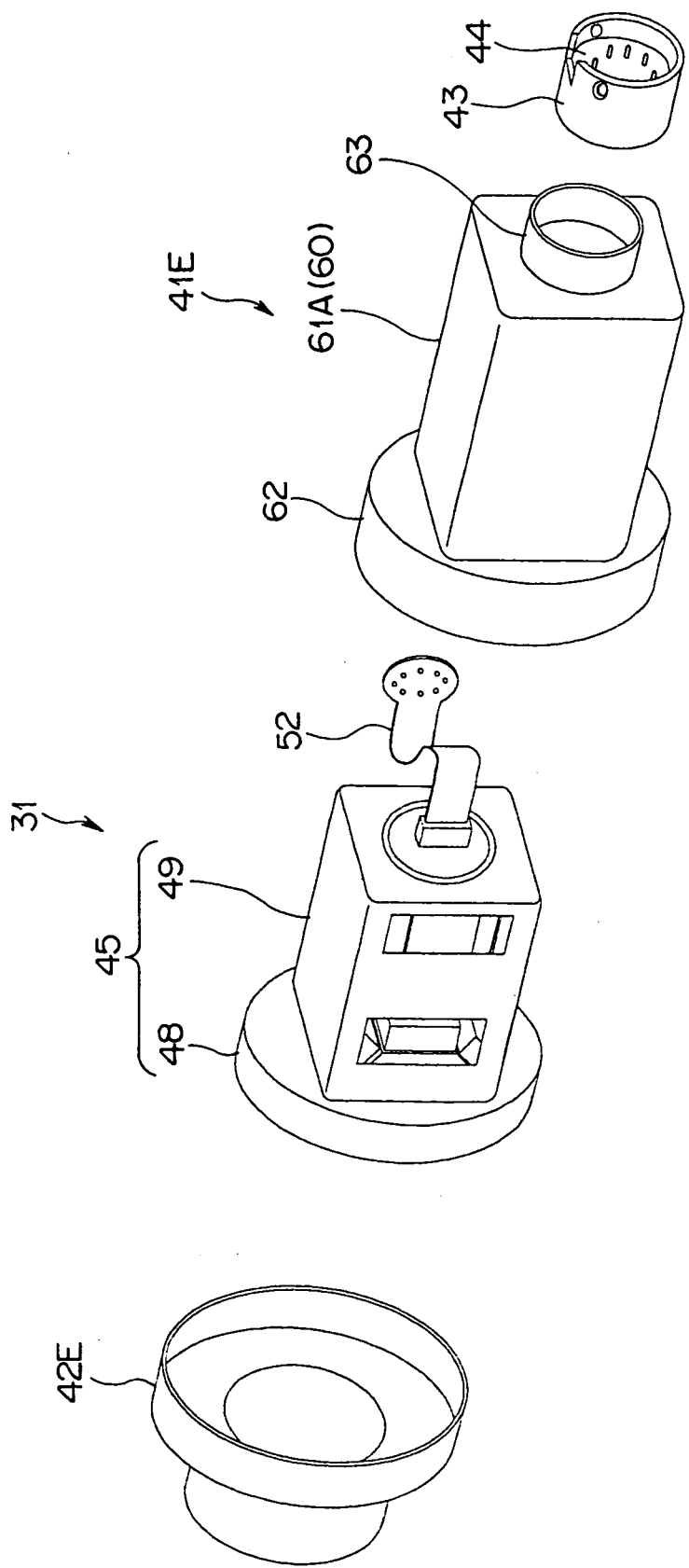
FIG. 11 is an exploded perspective view of a hermetic packaging in FIG. 10.
Figure 12:
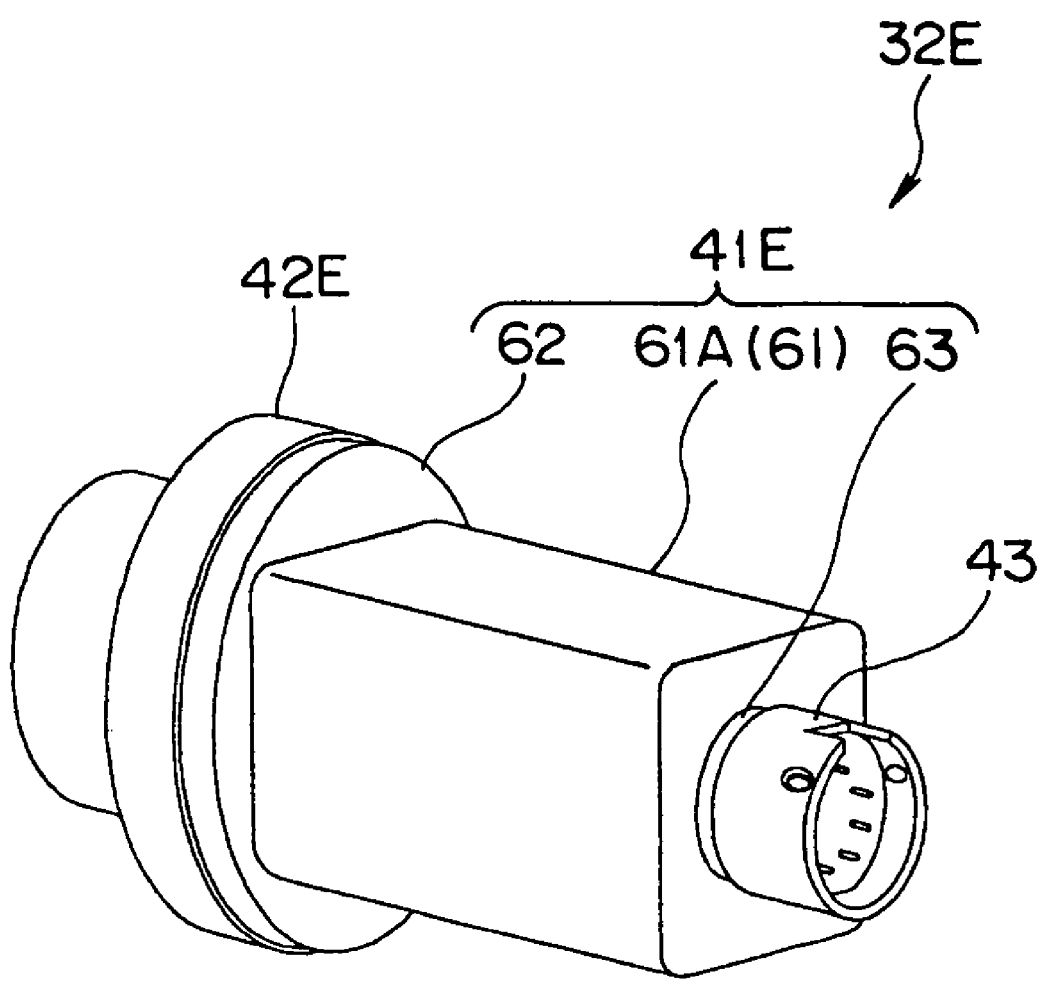
FIG. 12 is an assembly perspective view of the hermetic packaging in FIG. 10.

The hermetic packaging 32E is assembled in a manner similar to the first embodiment. Referring to FIG. 11, an image pickup unit 31 is enclosed in the packaging main frame 41E, and the lens frame 42E and an electrode frame 43 are fitted to both the ends of the packaging main frame 41E, thus assembling the hermetic packaging 32E as shown in FIG. 12.

The assembled hermetic packaging 32E is hermetically sealed by laser welding or soldering. The other components and conditions are substantially the same as those of the first embodiment and a description of the previously described components and conditions is omitted in the description of the second embodiment.

Consequently, the image pickup device 3E according to the second embodiment has the same advantages as those of the first embodiment.

Figure 13:
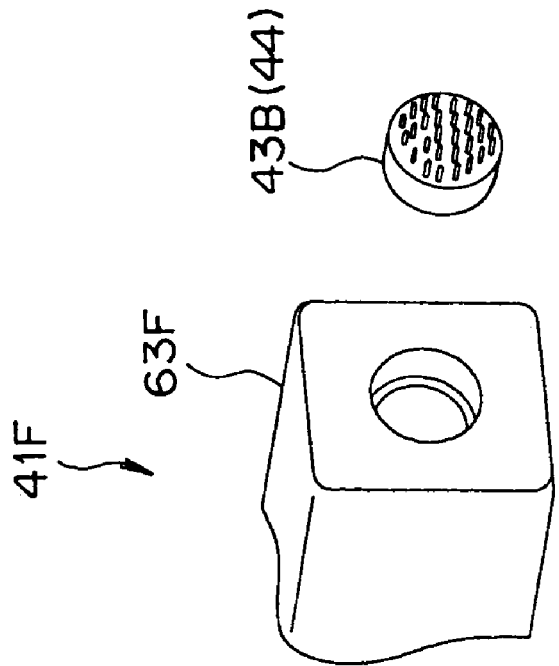
FIG. 13 is a perspective view of a modification of the hermetic packaging in FIG. 11, FIG. 13 showing a back-end hermetic joint portion of a packaging main frame before an electrode frame is attached to the back-end hermetic joint portion.

A back-end hermetic joint portion of the packaging main frame can also be designed as shown in FIG. 13. Referring to FIG. 13, a packaging main frame 41F has a back-end hermetic joint portion 63F which is not protruded, but recessed so that an electrode frame 43B (hermetic connector unit 44) can be received in the joint portion 63F.

Figure 14:
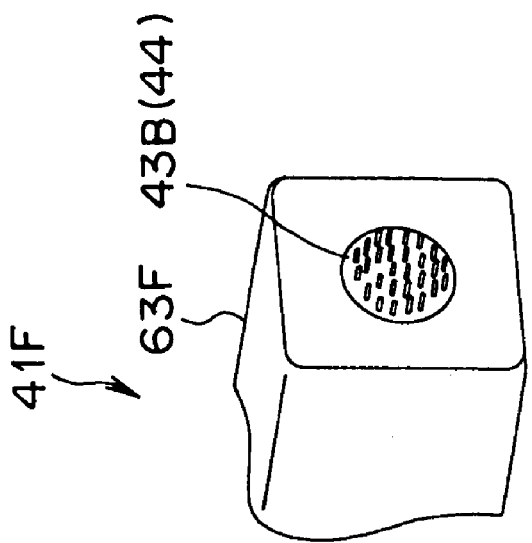
FIG. 14 is a perspective view of the hermetic packaging in which the electrode frame is received in the back-end hermetic joint portion of the packaging main frame.

Referring to FIG. 14, the electrode frame 43B (hermetic connector unit 44) is received in the back-end hermetic joint portion 63F of the packaging main frame 41F. After that, the joint portion is hermetically sealed by soldering or laser welding.

In the packaging main frame 41F, the back-end hermetic joint portion 63F is not protruded, but recessed. Consequently, the packaging main frame 41F can be reduced by the recess.

According to the above embodiments, the present invention is applied to the endoscopic image pickup device that is detachable from the eyepiece 13 of the endoscope 2. The present invention is not limited to the above device. The present invention can also be applied to general image pickup devices.

Having described the preferred embodiments of the invention referring to the accompanying drawings, it should understood that the present invention is not limited to those precise embodiments and various changes and modifications thereof could be made by one skilled in the art without departing from the spirit or scope of the invention as defined in the appended claims.

What is claimed is:

1. An image pickup device comprising:
   a hermetic packaging portion for hermetically enclosing an image pickup unit having at least one solid-state image pickup element, the hermetic packaging portion comprising:
   a non-cylindrical portion having a cross section substantially similar to that of the image pickup unit and
   two hermetic joint portions at both ends of the non-cylindrical portion, each hermetic joint portion having a cross-section with curved sections forming a cross-sectional shape without corners, said cross-section of said hermetic joint portions being different than said cross section of said non-cylindrical portion.

2. The image pickup device according to claim 1, wherein in the hermetic packaging portion, the non-cylindrical portion is a packaging main body for enclosing the image pickup unit, and one of the hermetic joint portions is a front hermetic joint portion for hermetically joining a lens frame to the front end of the packaging main body and the other hermetic joint portion is a back-end hermetic joint portion for hermetically joining an electrode frame with the back end of the packaging main body.

3. The image pickup device according to claim 1, wherein the image pickup unit has three solid-state image pickup elements.

4. The image pickup device according to claim 1, wherein each hermetic joint portion has a nearly rectangular section with rounded corners.

5. The device according to claim 1, wherein each hermetic joint portion has a circular section.

6. The device according to claim 1, wherein each hermetic joint portion has an oval section.

7. The device according to claim 2, wherein an exterior portion covers the hermetic packaging portion to form an image pickup optical unit.

8. The device according to claim 2, wherein the hermetic packaging portion has therein image-forming optical system for forming an optical image on an image pickup plane of the solid-state image pickup element and a focusing unit for moving the image-forming optical system along an optical axis to adjust a focus.

9. The device according to claim 2, wherein the back-end hermetic joint portion is recessed so as to receive the electrode frame.

10. The device according to claim 8, further comprising: an optical adapter unit having the image-forming optical system for forming an optical image on the image pickup plane of the solid-state image pickup element and the focusing unit for moving the image-forming optical system along the optical axis to adjust a focus, the optical adapter unit being connected to an image pickup optical unit.

11. The device according to claim 10, wherein the image pickup optical unit is detachable from the optical adapter unit.

12. The device according to claim 10, wherein the optical adapter unit has a connecting portion which is connectable to an eyepiece of an endoscope.

13. The device according to claim 12, wherein the eyepiece of the endoscope is detachable from the connecting portion.

14. The device according to claim 1, wherein the hermetic packaging portion includes:

a packaging main body for enclosing the image pickup unit;

a front hermetic joint portion for hermetically joining a lens frame to the front end of the non-cylindrical portion; and a back-end hermetic joint portion for hermetically joining an electrode frame to the back end of the non-cylindrical portion.

15. The device according to claim 14, wherein an exterior portion covers the hermetic packaging portion to form an image pickup optical unit.

16. The device according to claim 14, wherein the hermetic packaging portion has therein image-forming optical system for forming an optical image on an image pickup plane of the solid-state image pickup element, and a focusing unit for moving the image-forming optical system along an optical axis to adjust a focus.

17. The device according to claim 14, wherein the back-end hermetic joint portion is recessed so as to receive the electrode frame.

18. The device according to claim 15, further comprising: an optical adapter unit including image-forming optical system for forming an optical image on an image pickup plane of the solid-state image pickup element and a focusing unit for moving the image-forming optical system along an optical axis to adjust a focus, the optical adapter unit being connected to the image pickup optical unit.

19. The device according to claim 18, wherein the image pickup optical unit is detachable from the optical adapter unit.

20. The device according to claim 18, wherein the optical adapter unit has a connecting portion that is connectable to an eyepiece of an endoscope.

21. The device according to claim 20, wherein the eyepiece of the endoscope is detachable from the connecting portion.

22. An image pickup device comprising:

a hermetic packaging portion for hermetically enclosing an image pickup unit having at least one solid-state image pickup element, the hermetic packaging portion including:

a non-cylindrical packaging main body which encloses the image pickup unit and has a cross section substantially similar to that of the image pickup unit, and hermetic joint portions at both the ends of the packaging main body, each hermetic joint portion having a cross section with curved sections forming a cross sectional shape without corners.

23. The device according to claim 22, wherein one of the hermetic joint portions is a front hermetic joint portion for hermetically joining a lens frame to the front end of the packaging main body and the other hermetic joint portion is a back-end hermetic joint portion for hermetically joining an electrode frame to the back end of the packaging main body.

24. An image pickup device comprising:

a hermetic packaging portion for hermetically enclosing an image pickup unit having at least one solid-state image pickup element, the hermetic packaging portion including:

a non-cylindrical packaging main body which encloses the image pickup unit and has a cross section substantially similar to that of the image pickup unit, a front hermetic joint portion for hermetically joining a lens frame to the front end of the packaging main body, and a back-end hermetic joint portion for hermetically joining an electrode frame to the back end of the packaging main body.

* * * * *